United States Patent [19]
Saito et al.

[11] 4,085,169
[45] Apr. 18, 1978

[54] PROCESS FOR PREPARING STYRENIC POLYMER PARTICLES

[75] Inventors: Fumio Saito, Tsurunosato Ohtsu; Fumito Yamai, Kusatsu; Yositugu Beppu, Shiga; Shinpei Nakayama, Kusatsu, all of Japan

[73] Assignees: Sekisui Kagaku Kogyo Kabushiki Kaisha, Osaka; Sekisui Kaseihin Kogyo Kabushiki Kaisha, Nara, both of Japan

[21] Appl. No.: 617,624

[22] Filed: Sep. 29, 1975

Related U.S. Application Data

[63] Continuation of Ser. No. 381,460, Jul. 23, 1973, abandoned.

[51] Int. Cl.$^2$ ............................................. C08F 257/02
[52] U.S. Cl. ............................... 260/886; 260/2.5 HB; 526/212; 526/225; 526/233
[58] Field of Search ................ 260/93.5, 886, 2.5 B

[56] References Cited

U.S. PATENT DOCUMENTS

| | | | |
|---|---|---|---|
| 2,934,530 | 4/1960 | Ballast | 260/93.5 |
| 3,423,351 | 1/1969 | Pierce | 260/29.6 |
| 3,440,219 | 4/1969 | Wolff | 260/63 |
| 3,696,172 | 10/1972 | Kaiho | 260/880 R |
| 3,736,273 | 5/1973 | Hatano | 260/2.5 B |

*Primary Examiner*—Christopher A. Henderson
*Attorney, Agent, or Firm*—Sughrue, Rothwell, Mion, Zinn and Macpeak

[57] ABSTRACT

Styrenic polymer particles having a substantially uniform particle size are prepared by suspending styrenic polymer particles having particle sizes in a certain range in water to provide an aqueous suspension and after adding to the suspension a styrenic monomer, a suspension polymerization catalyst and a polymerization retarder in an amount of 1/200 to 1/15 mole per 1 mole of the catalyst, conducting the suspension polymerization. By conducting the polymerization in the presence of a foaming agent, one can produce foamable styrenic polymer particles having a substantially uniform particle size.

6 Claims, No Drawings

PROCESS FOR PREPARING STYRENIC POLYMER PARTICLES

This is a continuation of application Ser. No. 381,460, filed July 23, 1973, now abandoned.

BACKGROUND OF THE INVENTION

1. Field of the Invention

The present invention relates to a novel process for preparing styrenic polymer particles and, more particularly, it relates to a process for preparing styrenic polymer particles having a substantially uniform particle size and further to a process for preparing foamable styrenic polymer particles having a substantially uniform particle size.

2. Description of the Prior Art

Styrenic polymers have hitherto been prepared by various polymerization processes such as emulsion polymerization processes and suspension polymerization processes. In the case of directly preparing a granular styrenic polymer, a suspension polymerization process must be employed, but by ordinary suspension polymerization processes it is difficult to prepare styrenic polymer particles having particle sizes in a definite range. That is, in order to suspend a styrenic monomer in the production of polymer particles by a suspension polymerization process, it is necessary to use a suspending agent and to stir the polymerization system. However, in such a case, the sizes of the styrenic polymer particles formed by the suspension polymerization are highly influenced by the kind of suspending agent as well as the stirring conditions, etc. Furthermore, even if the kind of suspending agent and the stirring and other conditions are strictly selected or defined, it is still difficult to produce polymer particles having particle sizes in a definite range by a suspension polymerization process.

In general, if it is possible to make the particle sizes of polymer particles uniform in a definite range, various advantages ensue, e.g., in the case of continuously supplying the styrenic polymer particles to a molding machine (such as an extruding machine), continuous supply of the polymer particles is facilitated and the amount supplied does not vary, which results in moldings having stable qualities. In particular, in producing foamed styrenic resin moldings by processing foamable styrenic polymer particles prepared by impregnating a foaming agent in the polymer particles, there has been an urgent need for polymer particles having uniform particle sizes. This is because if the particle sizes of the foamable polymer particles are too small, the foaming agent contained in the polymer particles readily escapes and thus the foamable polymer particles are apt to lose their foamability during storage, while if the particle sizes of the foamable polymer particles are too large, the packing ratio of the polymer particles is poor in the case of preparing moldings, and thus moldings of a good weld (where the particles melt and adhere well with each other so as to not separate out) are not obtained, and it takes a long time to impregnate the polymer particles with a foaming agent to provide foamable polymer particles. Furthermore, if the particle sizes of foamable polymer particles are uneven, it is difficult to uniformly foam the polymer particles since the foaming time differs between large polymer particles and small polymer particles. For the reasons described above, it has been desired to obtain uniform particles of a mean particle size in the range of 0.8 to 2.5 mm.

However, as mentioned above, it is extremely difficult to obtain polymer particles having a uniform mean particle size by conventional suspension polymerization processes. More practically speaking, the formation of a large proportion of polymer particles having smaller particle sizes than the desired sizes is inevitable with conventional suspension polymerization processes. In particular, it is difficult by conventional suspension polymerization processes to obtain polymer particles having particle sizes larger than 1.5 mm. in good yield, and thus in the case of producing such polymer particles by conventional polymerization processes, polymer particles having the desired particle sizes can be obtained only by sieving off more than a half of the polymer particles obtained by the suspension polymerization and collecting the recovered polymer particles.

In particular, in the case of obtaining foamable polymer particles having desired particle sizes by sieving the foamable polymer particles prepared by a suspension polymerization process, the use of the waste polymer particles for other purposes is greatly limited since they contain a foaming agent.

For the reasons described above, the discovery of a process for producing polymer particles having uniform particle sizes by a suspension polymerization has strongly been desired.

SUMMARY OF THE INVENTION

One object of this invention is, therefore, to provide an improved process of preparing styrenic polymer particles having substantially uniform particle sizes by a suspension polymerization.

Another object of this invention is to provide a process of making uniform polymer particles by a suspension polymerization in a defite particle size range.

One highly specific but non-limitative object of the present invention is to provide styrene product of a particle size of 0.6 to 3 mm., preferably 0.8 to 2.5 mm.

The inventors attempted to utilize smaller styrene polymer particles among the styrenic polymer particles having uneven particle sizes prepared by a conventional suspension polymerization process by dissolving the smaller polymer particles in styrene monomer and subjecting the solution to a suspension polymerization with the addition of a suspension polymerization catalyst. However, by such a process, it was difficult to prevent the formation of polymer particles having smaller particle sizes.

Furthermore, the inventors also confirmed that by suspending small particles of styrenic polymer in water and then conducting the suspension polymerization in the presence of a polymerization catalyst after dropwise adding a styrenic monomer to the suspension system, the styrenic monomer polymerizes and forms around the suspended small styrenic polymer particles, and, as a result thereof, polymer particles having uniform particle sizes can be obtained. However, in this process, although the greater part of the smaller polymer particles can be converted into larger polymer particles having a uniform particle size, the process has been accompanied by the fault that fine-powdery polymer is partially formed.

As a result of various investigations to overcome the aforesaid difficulties, the inventors discovered an improved suspension polymerization process which is not accompanied by the faults of conventional suspension polymerization processes.

That is, according to the present invention, there is provided a process of preparing styrenic polymer particles by the suspension polymerization of a styrenic monomer using styrenic monomer and styrenic polymer particles as raw materials, which comprises suspending styrenic polymer particles having selected particle sizes in a certain range in water and adding to the suspension the styrenic monomer, a suspension polymerization catalyst, and a polymerization retarder having a molecular weight of at least 200 in an amount of 1/200 to 1/15 mol per mol of the catalyst.

DETAILED DESCRIPTION OF THE INVENTION

The styrene monomers and styrene polymers used as raw materials in the present invention are not, of course, limited to a monomer of styrene per se or a homopolymer of styrene per se, respectively, though practically speaking, using styrene monomer and polystyrene per se is a most preferred embodiment of the present invention.

On the contrary, not only are homopolymers of styrene such as styrene per se, o-methylstyrene, m-methylstyrene, p-methylstyrene, ethylstyrene, α-methylstyrene, p-chlorostyrene, 2,4-dichlorostyrene and the like useful, but mixtures of such materials and copolymers thereof with a different copolymerizable monomer can be used.

Typical of such different copolymerizable monomers are ethylenically unsaturated monomers copolymerizable with the styrene material, e.g., ester monomers comprising an alkyl alcohol having from 1 to 12 carbon atoms (polyalcohols are not used) and an acid monomer.

Specific examples of such different copolymerizable monomers are acrylic esters such as methylacrylate, ethylacrylate, butylacrylate, etc., methacrylic esters such as methylmethacrylate, ethylmethacrylate, etc., maleic esters such as dimethylmaleate, diethylmaleate, dibutylmaleate, etc., fumaric esters such as dimethylfumarate, diethylfumarate, etc., acrylonitrile and the like.

Phrased differently, the monomer copolymerized with the styrene of the present invention can be freely selected from those known in the art as modifiers for polystyrene. In a similar manner, the different types of styrene materials heretofore recited can be freely blended to obtain the optimum characteristics of different types of styrene materials, for instance, styrene per se and α-methylstyrene can be used as a monomer mixture or in polymer form as the monomer and polymer particle raw materials, respectively.

However, as one replaces increasing amounts of the styrenic material with a different copolymerizable monomer, one obviously begins to depart further and further from the essential characteristics of the styrenic materials. The basic purpose of using the different copolymerizable monomers is, of course, to alter the characteristics of the product obtained from those of the styrenic materials per se. Generally speaking, seldom would one use any non-styrenic material in an amount greater than 50 weight % in the monomer of polymer particle starting materials since in this case one would essentially be trending away from a styrene product to a product where the different copolymerizable monomer properties are emphasized. In fact, generally speaking, no more than 40 weight % of a different copolymerizable monomer (other than the styrenic materials) will be used in the styrene monomer or styrene polymer particle raw materials, though if used they will be used in an amount greater 1 weight %.

The general trend will also be to use the more reactive styrenic materials, e.g., the chlorostyrenes are very poor in reactivity, and generally will not be used on an industrial scale.

Furthermore, the product of the present invention can include other components or monomers which have a small crosslinking activity, such as divinyl benzene, polyethylene glycol dimethacrylate and the like. However, with such materials generally very small proportions are used in light of their cross-linking activity. Typically, on the order 0.02 to 5 weight % will be used, based on product weight.

Summarizing the above, it will be seen by one skilled in the art that the present invention is not limited to a homopolymer of styrene per se but includes homopolymers of other styrenic materials, polymers formed from mixtures thereof and, in fact, copolymers or even terpolymers formed of a styrenic material(s) and another different monomer or monomers copolymerizable therewith. Nonetheless, it must be kept in mind that the present invention is directed to the formation of a polystyrene, and generally, as lesser and lesser amounts of styrenic materials are present in the final product, the further will be the deviation from the desirable properties of the polystyrenes.

In the following discussion, the terms "styrene monomer" or "styrenic polymer" or like terminology used to describe the raw materials refer to all such homopolymers, copolymers or terpolymers. In the specific working examples, however, styrene or polystyrene per se is meant, unless otherwise indicated.

With regard to the particle sizes of the styrenic polymer used as a part of the raw materials in the process of this invention, it is required that the polymer particles have a uniform particle size or particle sizes in a certain range, and further the size of the polymer particles must be smaller than the size of the styrenic polymer particles to be prepared according to the process of this invention. As mentioned above, when a styrenic monomer is polymerized by a conventional suspension polymerization process, the formation of styrenic polymer particles having particle sizes smaller than about 0.8 mm. is inevitable, together with large polymer particles. Such small polymer particles are suitable as the styrenic polymer particles used as one component of the raw materials in the process of this invention, and by using the small polymer particles, styrenic polymer particles having the desired particle sizes can be produced with a yield of almost 100 percent.

The reason why styrenic polymer particles having a uniform particle size are required as one component of the raw materials in the process of this invention is as follows: in the case of preparing the styrenic polymer particles by the process of this invention, polymer particles having a uniform particle size as indicated above give styrenic resin particles having a uniform particle size, while polymer particles having uneven particle sizes give styrenic resin particles having uneven particle sizes.

The uniformity of the particle sizes of the styrenic polymer particles to be employed as one component of the raw materials in the process of this invention is preferably defined by the following standard. That is, when in the case of sieving the polymer particles, the mesh size of the sieve prescribing the larger polymer particles is designated as $d_{max}$, and the mesh size of the sieve prescribing the smaller polymer particles is designated as $d_{min}$, and $d_{max} = n \times d_{min}$, materials satisfying the relationship of $1 < n \leq 3$ are preferred, and materials satisfying the relationship of $1 < n \leq 1.5$ are particularly preferable.

The particle sizes of the styrenic polymer particles to be used as one component of the raw materials in the process if this invention will now be further explained in detail: That is, the particle sizes of the styrenic polymer particles obtained by the process of this invention are determined by the extent of the particle sizes of the styrenic polymer particles used as one component of the raw materials and the amount of the styrenic monomer to be used as another component of the raw materials. For example, if it is desired to produce styrenic polymer particles having large particle sizes using styrenic polymer particles having small particle sizes as one component of the raw materials, the polymerization can be conducted by using a large amount of the styrenic monomer, while if it is desired to produce styrenic polymer particles having not so large particle sizes from the same polymer particles, the polymerization can be conducted by using a reduced amount of the styrenic monomer. More practically speaking, in the case of producing styrenic polymer particles having uniform particle sizes in the range of about 0.85 to about 1.1 mm. using styrenic polymer particles having particle sizes of 0.4 to 0.5 mm. as the one component of the raw materials in the process of this invention, 90 parts of the styrenic monomer may be used per 10 parts by weight of the aforesaid polymer particles as the raw material, and if it is desired to produce styrenic polymer particles of 0.6 to 0.8 mm. in particle size using the same raw material, 65 parts by weight of the styrenic monomer may be used per 35 parts by weight of the raw material polymer particles. On the other hand, when 95 parts by weight of styrenic monomer are added to 5 parts by weight of raw materials having particle sizes of 0.4 to 0.5 mm., polymers having a particle size of about 2 mm. can be obtained.

The amount of styrene polymer(s) used is 5 to 60 weight % of the polymer particles produced and that of styrene monomer(s) used is 95 to 40 weight % of the polymer particles produced. Accordingly, the particle size of the polymer raw material is preferably about 0.4 to about 1.8 mm. (calculated value).

Accordingly, almost all of the small styrenic polymer particles, the use of which for other purposes is greatly restricted in the conventional art, can be used as the raw material for producing styrenic polymer particles having desired particle sizes if they are further sieved into polymer particles having particles sizes in the desired particle size range.

In the present invention, the raw material styrene particles generally used on a commercial scale will have a polymerization degree of from about 800 to about 3,000. This range is not limitative, however, since on a laboratory scale styrene particles of a much higher degree of polymerization can be used, for example, up to about 20,000 or more.

In the process of this invention, a catalyst is used. As the catalyst, ones generally used as suspension polymerization catalysts can be used and examples of such catalysts are organic peroxides such as benzoyl peroxides, lauroyl peroxide, t-butyl peroxybenzoate, t-butyl peroxypivalate, etc., and azo compounds such as azobisisobutyronitrile, azobisdimethyl valeronitrile, etc. These catalysts can be used alone or as a combination of two or more thereof. It is preferred to use the aforesaid catalysts as a solution thereof in the styrenic monomer to be used in the polymerization, in a solvent having no influence on (inert to) the polymerization reaction, or a mixture of the styrenic monomer and the solvent mentioned above, but it is most preferred to use the catalyst as a solution thereof in the styrenic monomer. Examples of solvents having no influence on the polymerization reaction used for the above purpose are toluene, benzene, 1,2-dichloropropane, etc. The amount of the solvent used is usually 0.2 to 5 weight % based on polymers obtained. The reason why the solvent is used is that due to the effect of the solvent used, polymers are softened, foaming magnification is raised during foaming and foaming time is shortened.

In the process of this invention, a suspending agent is also used. Examples of such a suspending agent are water-soluble high molecular weight materials such as polyvinyl alcohol, methyl cellulose, etc., and slightly soluble inorganic materials such as calcium phosphate, magnesium pyrophosphate, etc. Mixtures of such suspending agents can also be used. Specific examples thereof are a mixture of polyvinyl alcohol and methylcellulose, a mixture of calcium phosphate and magnesium pyrophosphate, a mixture of calcium phosphate and polyvinyl alcohol, etc.

In order to obtain foamable styrenic polymer particles by the process of this invention, the use of a foaming agent is required. As the foaming agent, one which does not dissolve the styrenic polymer or which only slightly swells the styrenic polymer, which has a boiling point lower than the softening point of the above-described polymer and which is in the gaseous or liquid state at room conditions is used. Examples of such a foaming agent are aliphatic hydrocarbons, e.g., having 1 to 6 carbon atoms, most preferably 3 to 5 carbon atoms, and boiling point ranges of $-42°$ to $36°$ C, such as propane, butane, pentane, etc., cycloaliphatic hydrocarbons such as cyclobutane, cyclopentane, etc., and halogenated hydrocarbons such as methyl chloride, dichlorodifluoromethane, etc. Gaseous foaming agents as can be used at normal temperature include, e.g., propane, butane, etc. Other examples of foaming agents are propylene, isobutane, butylene-1, cis-buthylene-2, trans-butylene-2, isobutylene, neopentane, butadiene, methyl chloride, ethyl chloride, vinyl chloride, dichlorofluoromethane, chlorotrifluoromethane, dichlorodifluoromethane, chlorodifluoromethane, etc.

Mixtures of foaming agents can also be used. Specific examples of such mixtures are a mixture of propane and butane, a mixture of butane and pentane, etc.

The foaming agents may be added in any step, i.e., before, during or after the polymerization of styrenic monomer, e.g., after adding the styrenic monomers and polymerizing catalyst solutions to be reacted, the foaming agent may be added in any step, e.g., at elevated pressure of 2 to 20 kg/cm².

According to the process of this invention, small particles of styrenic polymer having a uniform particle size in a definite range are suspended in water and then the styrenic monomer is added to the suspension, whereafter polymerization of the monomer proceeds in the state of being absorbed in the polymer particles, whereby the small styrenic polymer particles grow into larger polymer particles and thus styrenic polymer particles having a large uniform particle size are obtained.

The course of the formation of the styrenic polymer particles was investigated in detail. That is, it was found that the styrenic monomer added dropwise to the suspension was brought into the form of fine oil droplets by the action of the stirring, the suspending agent, and a surface active agent, etc., but although the greater part of the styrenic monomer in the oil droplet state is absorbed in the styrenic polymer particles, a part of the styrenic monomer remains as oil droplets in the suspension and the fine oil droplets form fine powders of the styrenic polymer by polymerization at the same time as the styrenic polymer absorbed in the polymer particles is polymerized, whereby fine powders of the polymer result to cause various problems such as clogging in the dehydration and drying step. Further, the yield of product is reduced by the amount of the fine powdery polymer.

It was found that if the styrenic polymer particles having comparatively small particle sizes are suspended in water in a large amount with respect to the styrenic monomer added, the formation of the fine powdery styrenic polymer is lessened due to an increase in the surface area of the polymer particles for absorbing styrenic monomer, but such a procedure does not satisfy the objects of the present invention and cannot satisfactorily reduce the formation of the fine-powdery styrenic polymer.

Regarding surface active agents as may be used in the present invention, as were briefly mentioned above, anionic surface active agents are generally used only when an inorganic suspending agent is used. Examples of the anionic surface active agents are sodium dodecylbenzenesulfonate, sodium laurylsulfate, etc. The amount of such anionic surface active agents is 0.05 to 0.1% by weight of the water used for best results.

As a result of investigations to overcome the above problems, the inventors discovered that in order to prevent the styrenic monomer added to the suspension from being present in the fine oil droplet state in the suspension and undergoing polymerization in the oil droplet state, the addition of a polymerization retarder having a molecular weight of at least 200 to the styrenic monomer in an amount of 1/200 to 1/15 mol per mol of the catalyst used for the suspension polymerization is quite effective, that is, by the addition of such a polymerization retarder to the suspension, the progress of the polymerization of the styrenic monomer in the fine oil droplet state can be prevented, whereby the formation of the fine-powdery styrenic polymer is prevented.

A polymerization retarder exhibits, when added to the styrenic monomer, the action of retarding the progress of the polymerization of the monomer even if a catalyst is present in the polymerization system, but when the styrenic monomer is absorbed in the styrenic polymer particles the polymerization inhibitor is not easily absorbed in the polymer particles since the molecular weight of the polymerization retarder is large, and further, even if the polymerization retarder is absorbed in the polymer particles, the retarder diffuses very little in the polymer particles since the inhibitor does not dissolve the polymer particles, whereby the progress of the polymerization of the styrenic monomer absorbed in the styrenic polymer particles is hindered very little by the presence of the retarder. However, the polymerization of the styrenic monomer present in the suspension as fine oil droplets (not absorbed by the styrenic polymer particles) is retarded by the polymerization retarding effect of the polymerization retarder. Furthermore, the styrenic monomer in droplet form whose polymerization has been retarded is gradually absorbed in the styrenic polymer particles with the passage of time and thus the formation of the fine-powdery styrenic polymer is greatly reduced.

The polymerization retarder used for the purpose must have a molecular weight of at least 200 and be soluble in the styrenic monomer to be used. For example, p-tertiary-butyl catechol having a molecular weight of 166 and hydroquinone monomethyl ether having a molecular weight of 128 cannot be used since they not only have a high polymerization inhibiting effect but they are readily absorbed by the styrenic polymer particles due to their small molecular weight, which results in hindering the progress of the polymerization of the styrenic monomer absorbed in the styrenic polymer particles.

Example of polymerization retarders having molecular weights of at least 200 and being soluble in the styrenic monomer are phenolic compounds such as 3,5-ditertiary butyl-4-hydroxytoluene (molecular weight 220), 1,1-bis(4-hydroxy-phenyl) cyclohexane (molecular weight 268), 4,4-butylidene-bis(3-methyl-6-tertiary.-butyl phenol) (molecular weight 383), 1,3,5-trimethyl-2,4,6-tris-3,5-di-tertiary-butyl-4-hydroxybenzylbenzene (molecular weight 775), 2,2'-methylenebis(6-tertiary-butyl-4-methylphenol) (molecular weight 352), and the like; sulfur compounds such as dilaurylthiodipropionate (molecular weight 515), 4,4'-thiobis (3-methyl-6-tertiary-butylphenol) (molecular weight 359), and the like; and amine compounds such as N,N'-di-$\beta$-naphthyl-p-phenylenediamine (molecular weight 360), N-phenyl-N-isopropyl-p-phenylenediamine (molecular weight 226.3), and the like.

If, however, the polmerization retarder as described above is used in an amount of more than 1/15 mol per mol of the suspension polymerization catalyst used in the suspension polymerization, the polymerization retarder not only retards the polymerization of the styrenic monomer in the oil droplet state but is also greatly absorbed by the styrenic polymer particles to hinder the polymerization of the styrenic monomer in the polymer particles, whereby the polymerization efficiency is reduced. On the other hand, if the amount of the polymerization retarder is less than 1/200 mol per mol of the suspension polymerization catalyst, the progress of the polymerization of the styrenic monomer in the oil droplet state is insufficiently retarded, and thus the effect of preventing the formation of the fine-powdery styrenic polymer becomes lessened. Accordingly, in the process of this invention the amount of the polymerization retarder used is defined to be 1/200 to 1/15 mol per mol of suspension polymerization catalyst. The polymerization inhibitors, as illustrated above, can be used individually or as combinations of two or more thereof.

It is most preferred in the process of this invention to dissolve the total amount of the polymerization retarder in the styrenic monomer before use, but the polymerization retarder can be used in such a manner that the greater part (greater than 50 weight %, preferably 70 to 100 weight %) of the polymerization catalyst is dissolved in a part of the styrenic monomer to be used, a small part (less than 50 weight %, preferably 1 to 30 weight %) of the polymerization catalyst is dissolved in the greater part of the styrenic monomer, the polymerization retarder is added to one or both of the monomer solutions containing the polymerization catalyst, and then the monomer solutions are added dropwise to the suspension without mixing them before addition. Moreover, the polymerization retarder can be used as a solution thereof in a solvent which has no influence on the polymerization reaction.

Furthermore, in the process of this invention, a flame-retardant such as tris(2,3-dibromopropyl)phosphate, hexabromocyclododecane, etc.; a colorant such as o-phenylphenol, methyl salicylate, biphenyl, trichlorobenzene, and an internal lubricant such as a chlorinated paraffin, low-molecular weight polyethylene, etc., can be also used in the polymerization system as a solution in a solvent or in the styrenic monomer to be used. For example, excellent effects are obtained using 0.5 to 3 weight % of a flame-retardant, 0.05 to 2 weight % of a colorant and 0.05 to 2 weight % of an internal lubricant, based on the obtained polymer weight.

From the heretofore offered discussion, it will be apparent to one skilled in the art that the proportions of various components in the polymerization system of the present invention can vary greatly. However, after extended efforts the inventors determined highly preferred bounds where the process of the present invention can be conducted in a smooth, expeditious manner. In greater detail, it is most highly preferred in the present invention that the amount of styrene polymer particles comprise from 5 to 60 weight % of the polymer particles obtained, the styrene monomer comprises from 95 to 40 weight % of the polymer particles obtained, and water be used in an amount from 0.7 to 5 times, even more preferably 0.8 to 2 times, the weight of the polymer particles obtained. In such a system, catalyst is used in an amount of 0.05 to 2 weight %, most preferably 0.1 to 1 weight %, of the total monomer weight, and the suspending agent (when used) is preferably combined therewith an amount of from 0.05 to 3 weight %, most preferably 0.2 to 1 weight %, of the weight of the water used. The foaming agent, when used, is used in an amount of from 2 to 20 weight %, preferably 3 to 12 weight %, of the weight of the polymer particles obtained.

In the present invention, it is most important to observe the bounds of the polymerization retarder heretofore discussed, and one skilled in the art shall understand that the amount of polymer particles used, the amount of styrene monomer and the ratio thereof to water, the amount of catalyst, suspending agent and foaming agent can vary very widely, and that the above limits, while offering a highly superior polymerization system, are not per se limitative in the present invention.

The temperature and time of the polymerization reaction of the present invention are not limited. The temperature and time can both vary greatly with the amount and kind of catalyst(s) and the ratio of polymer to monomer, that is, degree of conversion. It can basically be said, however, that temperatures and times as are used in prior art processes for preparing styrene polymer particles are used in the present invention.

The pressure of reaction of the present invention during the addition of monomers is not overly critical, and reaction is preferably conducted under normal pressure. If desired, the reaction can be conducted under super atmospheric pressure, and generally a pressure range of from about 0 to 25 kg/cm$^2$ (gauge) is used. Little is to be gained in the process by the complicated equipment required for super atmospheric pressure, however.

The invention will be further illustrated in detail by the following examples.

Unless otherwise indicated in the Examples, the particle size of all products was 1.47 to 1.59 mm.

EXAMPLE 1

In a 5.6 liter polymerization vessel were placed 2390 g. of pure water and 9.6 g. of magnesium pyrophosphate and 0.29 g. of sodium dodecylbenzene sulfonate as suspending agents, and then 480 g. of polystyrene polymers having particle sizes in a range of 0.86 mm. to 0.93 mm. and having a mean degree of polymerization of 1486 were suspended in the mixture followed by stirring the mixture at a speed of 320 r.p.m. Separately, 6.92 g. of benzoyl peroxide and 0.063 g. of a polymerization retarder, 3,5-di-tertiary-butyl-4-hydroxytoluene (BHT, trade name, made by Sumitomo Chemical Co., Ltd.) (1/100 mol per mol of benzoyl peroxide) were dissolved in 1920 g. of styrene monomer to provide a monomer solution. By adding dropwise the solution prepared above to the mixture in the polymerization vessel continuously while maintaining the temperature in the vessel at 85° C., the polymerization of the suspension system was conducted at normal pressure under the following conditions:

For two hours from the start of dropping 170 g. per hour,

For two hours from the 2nd hour 320 g. per hour,

For two hours from the 4th hour 470 g. per hour.

After the addition of the aforesaid solution was finished, the polymerization reaction was continued for 1 hour and 30 minutes at the same temperature and when the polymerization percentage reached about 98%, the reaction product was cooled and withdrawn from the vessel. After decomposing the suspending agents by adding hydrochloric acid, the amount of powdery polystyrene formed and passed through a 32 mesh screen (JIS sieve mesh) was measured. The amount was found to be 0.52% by weight of the total amount of the polymer. When the small amount of the aforesaid powdery polystyrene formed was removed, more than 99% by weight of the polystyrene particles were in a particle size range of 10 - 12 mesh.

In addition, the amount of the polystyrene particles used as the raw material in the suspension was 20% by weight of the polystyrene polymer obtained after the polymerization.

Comparison Example 1

When the same procedure as in Example 1 was followed except that the polymerization retarder, 3,5-di-tertiary.butyl-4-hydroxytoluene, was not used, the amount of the powder polystyrene formed was 1.50% by weight.

EXAMPLE 2

The same procedure as in Example 1 was followed using 0.0766 g. of 1,1-bis (4-hydroxyphenyl) cyclohexane (1/100 mol per mol of the benzoyl peroxide) as the polymerization retarder in place of 3,5-di-tertiary.butyl-4-hydroxytoluene. The amount of the powder polystyrene formed was 0.58% by weight of the total amount of the polymer.

EXAMPLES 3 - 5

The same procedure as in Example 2 was followed while using 4,4'-butylidenebis(3-methyl-6-tertiary-butylphenol) (Sumilizer BBM, trade name, made by Sumitomo Chemical Co., Ltd.) in an amount as shown in the following table as the polymerization retarder in place of 1,1-bis(4-hydroxyphenyl) cyclohexane. The results are shown in the same table.

Table 1

| Example | Amount used | Mol per mol of benzoyl peroxide | Amount of powdery polystyrene formed |
|---|---|---|---|
| 3 | 0.1092 g. | 1/100 mol | 0.44% by weight |
| 4 | 0.2184 g. | 1/50 mol | 0.31% by weight |
| 5 | 0.4368 g. | 1/25 mol | 0.39% by weight |

EXAMPLES 6 – 10

The same procedure as in Example 1 was followed while using 1,3,5-trimethyl-2,4,6-tris-3,5-di-tertiary-butyl-4-hydroxybenzyl-benzene (Inonox 330, trade name, made by Shell Chemical Co.) as the polymerization retarder. The results are shown in the following table.

Table 2

| Example | Amount used | Mol per mol of benzoyl peroxide | Amount of powdery polystyrene formed |
|---|---|---|---|
| 6 | 0.1105 g. | 1/200 mol | 1.02% by weight |
| 7 | 0.2210 g. | 1/100 mol | 0.72% by weight |
| 8 | 0.4420 g. | 1/50 mol | 0.46% by weight |
| 9 | 0.8840 g. | 1/25 mol | 0.55% by weight |
| 10 | 1.4760 g. | 1/15 mol | 1.05% by weight |

Comparison Example 2

When the same procedure as in Examples 6 – 10 was followed except that 2.21 g. of 1,3,5-trimethyl-2,4,6-tris-3,5-di-tertiary-butyl-4-hydroxybenzylbenzene (1/10 mol per mol of benzoyl peroxide) was used, the polymerization was hindered, which greatly delayed the reaction and further the amount of the fine-powdery polymer formed increased greatly.

EXAMPLE 11

The same procedure as in Example 1 was followed while using 0.1470 g. of dilaurylthiodipropionate (DLTP, trade name, made by Yoshitomi Pharmaceutical Industries, Ltd.) (1/100 mol per mol of benzoyl peroxide) as the polymerization retarder. The results showed that the amount of the fine-powdery polystrene formed was 0.86% by weight.

EXAMPLE 12

When the same procedure as in Example 1 was followed while using 0.1024 g. of 4,4'-thiobis(3-methyl-6-tertiary.butylphenol) (Yoshinox SR, trade name, made by Yoshitomi Pharmaceutical Industries, Ltd.) (1/100 mol per mol of benzoyl peroxide) as the polymerization retarder, the amount of the fine-powdery polystyrene formed was 0.79% by weight.

EXAMPLE 13

When the same procedure as in Example 1 was followed while using 0.2056 g. of N,N'-di-β-naphthyl-p-phenylenediamine (Antigene F, trade name, made by Sumitomo Chemical Co.) (1/50 mol per mol of benzoyl peroxide) as the polymerization retarder, the amount of the fine-powdery polystyrene was 0.75% by weight.

EXAMPLE 14

In a 5.6 liter polymerization vessel were placed 2390 g. of pure water and 0.29 g. of sodium dodecylbenzenesulfonate and after suspending in the solution 480 g. of polystyrene particles having particle sizes in a range of 0.86 – 0.93 mm., the mixture was stirred at a stirring speed of 320 r.p.m. Separately, 6.92 g. of benzoyl peroxide, 0.1092 g. of 4,4'-butylidenebis(3-methyl-6-tertiary-butylphenol) (1/100 mol per mol of the benzoyl peroxide), and 0.1470 g. of dilaurylthiodipropionate (1/100 mol per mol of the benzoyl peroxide) were dissolved in a mixture of 1824 g. of styrene monomer and 96 g. of methyl methacrylate to provide a monomer solution, after which polymerization was initiated by raising the temperature of the liquid in the vessel to 85° C and maintaining at that temperature. Then, the monomer solution thus formed was added dropwise to the suspension prepared above (continuously) under the following conditions:

For two hours after the start of dropping 170 g. per hour,
For two hours after the 2nd hour 320 g. per hour,
For two hours after the 4th hour 470 g. per hour.

Thirty minutes before the addition of the monomer solution was over, 168 g. of n-pentane was added to the suspension polymerization system over a 15 minute period as a foaming agent. Thirty minutes after the addition of the monomer solution was over, the temperature of the reaction product was raised, and the polymerization was further conducted for 5 hours at a temperature of 110° C. The reaction product was then cooled and withdrawn from the vessel.

When the amount of the fine-powdery styrene-methyl methacrylate copolymer formed was measured in the same way as in Example 1, the amount thereof was 0.30% by weight of the total amount of the polymer. When the fine-powdery styrenemethyl methacrylate copolymer formed in the polymerization was removed, more than 99% by weight of the copolymer particles thus obtained were in a particle size range of 10 – 12 mesh.

When the copolymer particles were immersed in boiling water for 5 minutes, the copolymer particles foamed 86X (by bulk).

Also, when the product foamed 70X (by bulk) was heated for 90 seconds with steam at 1.2 kg/cm² in a loosely closed mold, a foamed molding of the styrene-methyl methacrylate copolymer of excellent weld was obtained.

Comparison Example 3

When the same procedure as in Example 12 was followed without, however, using the polymerization retarder, 4,4'-butylidenebis(3-methyl-6-tertiary-butylphenol) and dilaurylthiodipropionate, the amount of the fine-powdery styrene-methyl methacrylate copolymer formed was found to be 1.42% by weight of the total amount of the copolymer.

EXAMPLE 15

In a 5.6 liter pressure vessel equipped with a stirrer was placed a suspension prepared by adding 9.6 g. of magnesium pyrophosphate and 0.29 g. of sodium dodecylbenzene sulfonate to 2390 g. of water, and then 2400 g. of the polystyrene particles prepared in Example 7 were added to the suspension. Then, after adding to the mixture 14.4 g. of toluene, 120 g. of butane, and 120 g. of propane with stirring, the temperature of the resultant mixture was raised to 110° C from room temperature at which all additions were conducted, whereby the polystyrene particles were impregnated with butane and propane over a five hour period. The product was cooled and withdrawn from the vessel. When the product was immersed in boiling water for 5 minutes, the product foamed to 85X its original volume (by bulk).

When the foamed product was heated for 90 seconds with steam at 1.2 kg./cm.² in a mold having an 8 liter interior volume, which was only loosely covered, and after cooling was withdrawn, a molding of the polystyrene in which the foamed particles were completely welded to each other was obtained.

While the invention has been described in detail and with reference to specific embodiments thereof, it will be apparent to one skilled in the art that various changes and modifications can be made therein without departing from the spirit and scope thereof.

What is claimed is:

1. A process for reducing the amount of powdery polymer particles which pass through a 32 mesh sieve to thereby obtain styrenic polymer particles having a uniform particle size of 0.6 to 3 mm by preparing styrenic polymer particles by the suspension polymerization of a system comprising styrenic monomer droplets and styrenic polymer particles using the styrenic monomer and styrenic polymer particles as raw materials, which comprises suspending styrene homopolymer particles or copolymer particles of styrene monomer and up to 50% by weight of a different copolymerizable ester monomer comprising an alkyl alcohol having from 1 to 12 carbon atoms and being selected from the group consisting of acrylic esters, methacrylic esters, maleic esters and fumaric esters, having particle sizes of 0.4 to 1.8 mm in water containing a suspending agent selected from the group consisting of a water-soluble high molecular weight material and a slightly soluble inorganic material and adding to the suspension styrene monomer with up to 50% by weight of a different copolymerizable monomer selected from the group consisting of methylacrylate, ethylacrylate, butylacrylate, methylmethacrylate, ethylmethacrylate, dimethylmaleate, diethylmaleate, acrylonitrile, α-methylstyrene, divinylbenzene and mixtures thereof, a suspension polymerization catalyst, and a polymerization retarder which is soluble in the styrene monomer and which has a molecular weight of at least 200, said retarder being selected from the group consisting of 3,5-di-tertiary butyl-4-hydroxytoluene, 1,1-bis(4-hydroxy-phenyl) cyclohexane, 4,4′-butylidene-bis(3-methyl-6-tertiary butyl phenol), 1,3,5-trimethyl-2,4,6-tris-3,5-di-tertiary-butyl-4-hydroxybenzylbenzene, 2,2′-methylenebis (6-tertiary-butyl-4-methylphenol, dilaurylthiodipropionate, 4,4′-thiobis (3-methyl-6-tertiary-butylphenol), N,N′-di-β-naphthyl-p-phenylenediamine, and N-phenyl-N-isopropyl-p-phenylenediamine in an amount of 1/100 to 1/25 mol per mol of said suspension polymerization catalyst to conduct the polymerization of said styrenic monomer while absorbed in said polymer particles, whereby the size of said polymer particles is increased, said polymerization retarder retarding the polymerization of said styrenic monomer droplets until said styrenic monomer is absorbed by said polymer particles, the amount of said polymer and said monomer used as raw material being 5 to 60 weight % and 95 to 40 weight %, respectively, of the polymer particles produced, to thereby obtain sytrenic polymer particles having a uniform particle size of 0.6 to 3 mm.

2. The process of claim 1 wherein the weight ratio of styrenic monomer to styrenic polymer particles as raw materials is 95 : 5 to 60 : 40.

3. The process of claim 1 wherein the styrenic polymer particles as raw materials have a mesh size defined by $d_{max} = n \times d_{min}$, wherein $1 < n \leq 3$, where $d_{max}$ is the mesh size of the largest polymer particles and $d_{min}$ is the mesh size of the smallest polymer particles.

4. The process of claim 2 wherein $1 < n \leq 1.5$.

5. The process of claim 1 wherein said polymerization retarder is selected from the group consisting of 3,5-ditertiary, butyl-4-hydroxytoluene, 4,4′-butylidene bis (3-methyl-6-tertiary butyl phenol), N,N′-di-β-naphtyl-p-phenylenediamine and N-phenyl-N-isopropyl-p-phenylenediamine.

6. The process of claim 1 wherein the amount of powdery polymer particles which pass through a 32 mesh sieve is reduced to less than 1% by weight.

* * * * *